(12) United States Patent
Koyano

(10) Patent No.: US 7,515,296 B2
(45) Date of Patent: Apr. 7, 2009

(54) IMAGE PROCESSING APPARATUS, IMAGE PROCESSING METHOD, AND IMAGE PROCESSING CONTROL PROGRAM CAPABLE OF PROCESSING DOCUMENT DATA

(75) Inventor: Hiroki Koyano, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 895 days.

(21) Appl. No.: 10/975,509

(22) Filed: Oct. 29, 2004

(65) Prior Publication Data

US 2005/0094181 A1 May 5, 2005

(30) Foreign Application Priority Data

Oct. 31, 2003 (JP) .............................. 2003-372460

(51) Int. Cl.
G06K 15/00 (2006.01)
G06K 15/02 (2006.01)
G06F 17/22 (2006.01)
G06F 17/27 (2006.01)

(52) U.S. Cl. ........................ 358/1.18; 358/1.1; 358/1.13

(58) Field of Classification Search ................ 358/1.13, 358/1.18
See application file for complete search history.

(56) References Cited

U.S. PATENT DOCUMENTS 6,480,866 B2 * 11/2002 Mastie ........................ 715/255
7,315,979 B1 * 1/2008 Walker ....................... 715/234

FOREIGN PATENT DOCUMENTS

| JP | 8-44513 | 2/1996 |
| JP | 11-129566 | 5/1999 |
| JP | 2000-25297 | 1/2000 |
| JP | 2003-54065 | 2/2003 |

* cited by examiner

*Primary Examiner*—King Y Poon
*Assistant Examiner*—Lawrence E Wills
(74) *Attorney, Agent, or Firm*—Fitzpatrick, Cella, Harper & Scinto

(57) ABSTRACT

An image processing method of forming images of data onto a plurality of recording media each having an obverse surface and a reverse surface is disclosed. This method has a recognizing step of recognizing a delimiter of the data in document data and a recognizing step of, in the case where the delimiter of the data is recognized in the recognizing step when an image process is executed so as to form the image onto the obverse surface of a predetermined recording medium, recognizing an instruction showing either a mode to continue the image forming operation to the reverse surface of the recording medium or a mode to exchange the recording medium and continue the image forming operation from the obverse surface of another recording medium.

14 Claims, 11 Drawing Sheets

STATEMENT OF DELIVERY

| SHOP NAME | ARTICLE NAME | AMOUNT |
|---|---|---|
| XXXX XX | XXXX XX | ¥¥¥,¥¥9 |
| XXXX XX | XXXX XX | ¥¥¥,¥¥9 |
| XXXX XX | XXXX XX | ¥¥¥,¥¥9 |
| XXXX XX | XXXX XX | ¥¥¥,¥¥9 |
| XXXX XX | XXXX XX | ¥¥¥,¥¥9 |
| XXXX XX | XXXX XX | ¥¥¥,¥¥9 |
| XXXX XX | XXXX XX | ¥¥¥,¥¥9 |
| XXXX XX | XXXX XX | ¥¥¥,¥¥9 |

–P–

502

| SHOP NAME | ARTICLE NAME | AMOUNT |
|---|---|---|
| A SHOP, | CLOTHING, | 2000 |
| A SHOP, | CLOTHING, | 6000 |
| A SHOP, | CLOTHING, | 12000 |
| A SHOP, | SUNDRY GOODS, | 1000 |
| A SHOP, | SUNDRY GOODS, | 10000 |
| A SHOP, | SUNDRY GOODS, | 5000 |
| A SHOP, | SUNDRY GOODS, | 5000 |
| B SHOP, | HOUSEHOLD APPLIANCES, | 4000 |
| B SHOP, | HOUSEHOLD APPLIANCES, | 7000 |
| B SHOP, | HOUSEHOLD APPLIANCES, | 2000 |
| B SHOP, | HOUSEHOLD APPLIANCES, | 11000 |
| B SHOP, | HOUSEHOLD APPLIANCES, | 3000 |
| B SHOP, | GROCERIES, | 1000 |
| B SHOP, | GROCERIES, | 1000 |
| B SHOP, | GROCERIES, | 2000 |
| B SHOP, | GROCERIES, | 6000 |
| B SHOP, | GROCERIES, | 8000 |
| B SHOP, | GROCERIES, | 12000 |
| B SHOP, | GROCERIES, | 13000 |

FIG. 6

| BREAK KEY | SHOP NAME |
|---|---|
| TOTALIZING METHOD | TOTAL AMOUNT |

601

STATEMENT OF DELIVERY

| SHOP NAME | ARTICLE NAME | AMOUNT |
|---|---|---|
| A SHOP | CLOTHING | ¥2,000 |
| A SHOP | CLOTHING | ¥6,000 |
| A SHOP | CLOTHING | ¥12,000 |
| A SHOP | SUNDRY GOODS | ¥1,000 |
| A SHOP | SUNDRY GOODS | ¥10,000 |
| A SHOP | SUNDRY GOODS | ¥5,000 |
| A SHOP | SUNDRY GOODS | ¥5,000 |
| TOTAL PER SHOP | | ¥40,000 |

-1-

602

604

-2-

603

STATEMENT OF DELIVERY

| SHOP NAME | ARTICLE NAME | AMOUNT |
|---|---|---|
| B SHOP | HOUSEHOLD APPLIANCES | ¥4,000 |
| B SHOP | HOUSEHOLD APPLIANCES | ¥7,000 |
| B SHOP | HOUSEHOLD APPLIANCES | ¥2,000 |
| B SHOP | HOUSEHOLD APPLIANCES | ¥11,000 |
| B SHOP | GROCERIES | ¥3,000 |
| B SHOP | GROCERIES | ¥1,000 |
| B SHOP | GROCERIES | ¥2,000 |

-3-

STATEMENT OF DELIVERY

| SHOP NAME | ARTICLE NAME | AMOUNT |
|---|---|---|
| B SHOP | GROCERIES | ¥6,000 |
| B SHOP | GROCERIES | ¥8,000 |
| B SHOP | GROCERIES | ¥12,000 |
| B SHOP | GROCERIES | ¥13,000 |
| TOTAL PER SHOP | | ¥70,000 |

-4-

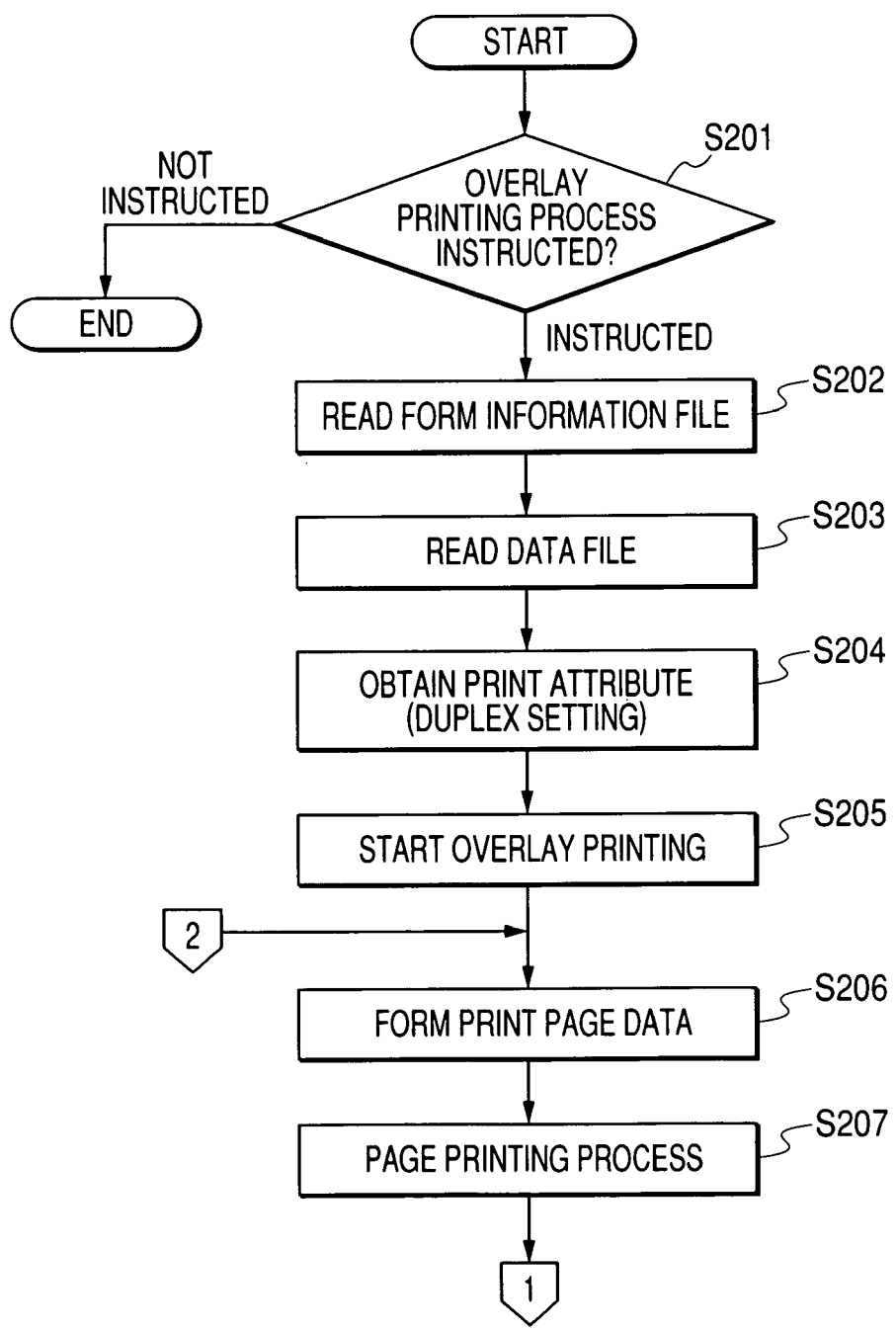

IMAGE PROCESSING APPARATUS, IMAGE PROCESSING METHOD, AND IMAGE PROCESSING CONTROL PROGRAM CAPABLE OF PROCESSING DOCUMENT DATA

BACKGROUND OF THE INVENTION

1. Field of the Invention

The invention relates to an image processing apparatus, a method, a control program, and the like which can form an image by generally using form data.

2. Related Background Art

In an application of designating, for example, a form such as "estimate sheet", "bill", or the like and a data file described in a text format, overlaying the data to them, and printing is executed (referred to as overlay printing) by using a printing process control program in a computer system or the like, a figure which is mainly constructed by ruled lines and formed by arranging figures to receive the data from the data file in a table format (such a figure is referred to as a table figure) is often defined. Such a table figure is constructed by: a portion at the head of the figure where names of data items are displayed; a portion where the received data is displayed; and a portion where a totalization result of the data is displayed (such a portion is referred to as a totalizing portion of the table figure). Among them, in the figure which is displayed in the totalizing portion of the table figure, a total value obtained by calculating data as totalizing targets by a totalizing method such as total, average, the number of items, or the like at the point when data serving as a totalizing reference (such data is referred to as a break key) is switched (referred to as a data break) in a totalizing range determined by the data break is displayed. A new-page process is executed together with the display of the totalizing portion of the table figure.

In the conventional technique, however, the new-page process is fixedly executed irrespective of a kind or contents of the break key.

For example, a case where during the execution of the overlay printing using a duplex printing function of a printer, the data break occurs in a duplex obverse printing mode is now considered. Inherently, since it is considered that the user has set the data break by presuming a target print result, in order to obtain a desired print result, the following two kinds of processing methods must be provided and one of them must be selectively used in accordance with the kind or contents of the break key: (1) the "new-page" process is executed and the printing is continued to the reverse surface of the same duplex sheet; and (2) the printing to the duplex reverse surface is skipped, the "new-page" process is executed, and the printing is continued to the obverse surface of a new duplex sheet. However, such a processing method itself does not exist.

SUMMARY OF THE INVENTION

An embodiment of the invention is made to eliminate at least one of the foregoing problems. One aspect of the embodiment of the invention is to provide a mechanism for making it possible to design print data which can certainly obtain a target print result independent of data, thereby reducing a load on the user.

Another aspect of the embodiment of the invention is to raise generality by increasing a degree of freedom in an application field by increasing the number of kinds as print results which can be realized.

For example, there is provided an image processing apparatus for forming images of data onto a plurality of recording media each having an obverse surface and a reverse surface, comprising: recognizing means for recognizing a delimiter of the data in document data; and recognizing means for, in the case where the recognizing means recognizes the delimiter of the data when an image process is executed so as to form the image onto the obverse surface of a predetermined recording medium, recognizing an instruction showing either a mode to continue the image forming operation to the reverse surface of the recording medium or a mode to exchange the recording medium and continue the image forming operation from the obverse surface of another recording medium. An image processing method, a control program, and the like for such an image processing apparatus are also disclosed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram showing an example of display formats of a form information file and a data file which are designated by an overlay printing process in the embodiment of the invention;

FIG. 6 is a diagram showing an example of a result printed in the case where the data break occurs in the duplex obverse printing mode in the embodiment of the invention;

DETAILED DESCRIPTION OF THE PREFERRED EMBODIMENTS

Embodiments of the present invention will now be described in detail in accordance with the accompanying drawings.

According to the overlay printing, for example, closing lines and the like in an original sheet format in a form are previously registered as form information by using a function called page registration or form registration provided for a page printer such as a laser printer or the like, and when the form information is printed together with data in a text format by using the page printer, by calling page information or using a function called a form information call, the form information which has previously been registered and the data in the text format can be printed so as to overlap with each other. Such overlap printing is generally called overlay printing. Form data (form information) which is used in the overlay printing is generally formed by using a dedicated form information designing system.

Figure 1:
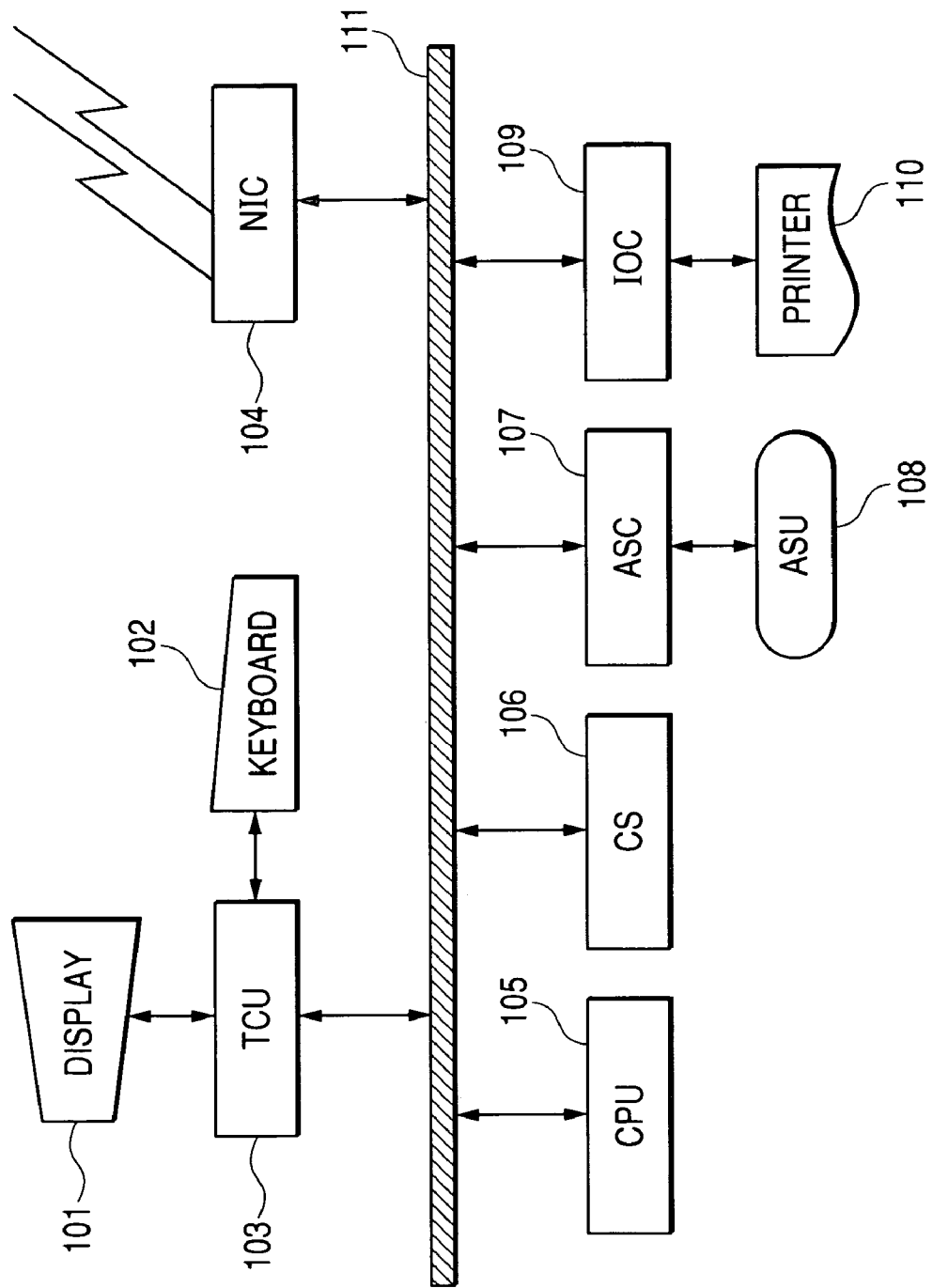
FIG. 1 is a constructional diagram of a system in which a form information designing system and an overlay print control system operate in an embodiment of the invention.

The embodiments of the invention will now be described hereinbelow with reference to FIGS. 1 to 10. FIG. 1 shows a construction of a computer system in which a form information designing system and an overlay print control system operate. In FIG. 1, a CPU 105 for controlling the whole apparatus controls the operation of the apparatus in accordance with control programs (control programs shown in flowcharts of FIGS. 8 to 10, or the like) stored in a central storage (CS) 106. The CS 106 is also a memory area for storing and executing an application program loaded from an auxiliary storage unit (ASU) 108 through an auxiliary storage controller (ASC) 107. Various application programs such as form information designing system, overlay print control system, adaptive working program for forming page data, and the like, which will be explained hereinafter, also exist in this memory area. The control program and the various application programs in the CS 106 are operated by instructions from the following two apparatuses. The first apparatus is an operator console comprising a display 101, a keyboard 102, and a terminal control unit (TCU) 103. The second apparatus is a network interface controller (NIC) 104 for inputting instruction information from an external computer system connected through a network such as LAN, WAN, or the like into the present computer system.

A printer 110 is connected to the computer system in the embodiment through an input output controller (IOC) 109. The printer 110 previously registers the form information which is inputted from the computer system into a memory, forms an overlay pattern by overlaying the data in the text format which is inputted from the computer system and a form pattern formed on the basis of the form information which has previously been registered in the memory, and overlay-prints the overlay pattern. A system bus 111 is a path along which transfer of data and program commands among the TCU 103, CPU 105, CS 106, ASC 107, IOC 109, etc. or the like is executed.

Figure 2:
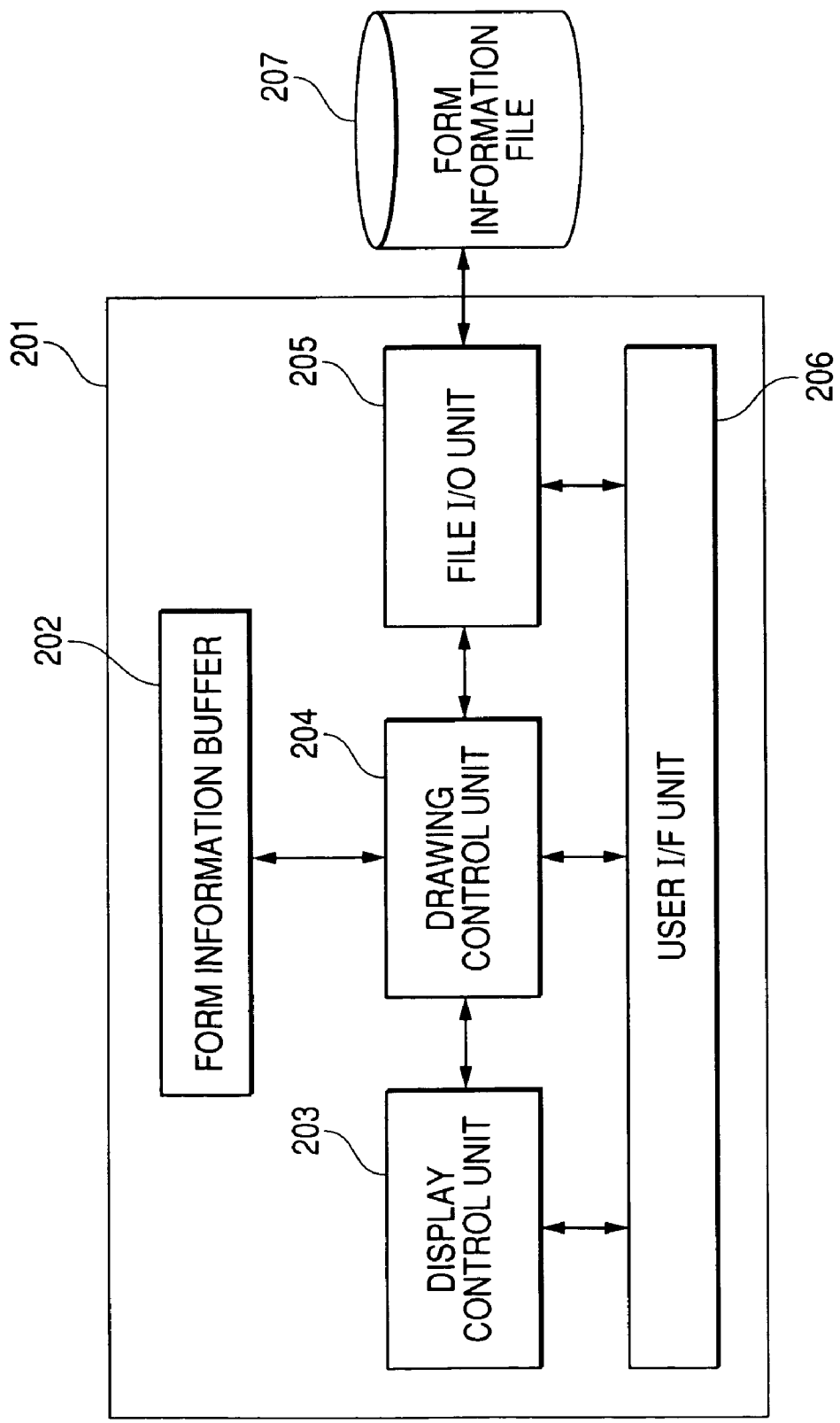
FIG. 2 is a block constructional diagram showing a construction of the form information designing system in the embodiment of the invention.

FIG. 2 is a block diagram showing a construction of the form information designing system. In FIG. 2, reference numeral 201 denotes the whole form information designing system in the embodiment. When the form information designing system is used, the form information designing system 201 exists on the CS 106 in FIG. 1. The CPU 105 controls a figure buffer 202, a display control unit 203 (display control program), a drawing control unit 204 (drawing control program), and a file input/output unit 205 (file input/output control program), which will be explained hereinafter, on the basis of a user interface unit 206 (whole control program), which will be explained hereinafter, in the form information designing system 201. The CPU 105 receives (through the TCU 103) an executing command, a form information forming command, and the like of the form information designing system which are inputted on the basis of the display control unit 203 (display control program) by using instructing means such as a pointing device or the like (not shown), analyzes the received various commands such as setting command, form information forming command, and the like on the basis of the user interface unit 206 (whole control program), and issues processing requests as internal commands to the drawing control unit 204 (drawing control program) and the file input/output unit 205 (file input/output control program).

The CPU 105 returns processing results of the drawing control unit 204 (drawing control program) and the file input/output unit 205 (file input/output control program) to the display control unit 203 (display control program) on the basis of the user interface unit 206 (whole control program) and displays the processing results onto the display 101 on the basis of the display control unit 203 (display control program).

Specifically explaining, the display control unit 203 (display control program) is a program for displaying the form pattern based on the form information that is being designed at present in the form information buffer 202 onto the display 101 in FIG. 1 through the drawing control unit 204 (drawing control program) or receiving the various commands such as setting command, form information forming command, and the like of the user that were inputted by using the keyboard 102 in FIG. 1, the pointing device (not shown), or the like.

The drawing control unit 204 (drawing control program) is a program for managing the form information buffer 202, inputting and outputting all formed form information elements into/from the form information buffer 202, and bidirectionally transferring them to the display control unit 203 (display control program) and the file input/output unit 205 (file input/output control program) by a command from the user interface unit 206 (whole control program).

The file input/output unit 205 (file input/output control program) is a program for writing and reading the form information that is being designed at present in the form information buffer 202 through the drawing-control unit 204 into/from a form information file 207 existing in the ASU 108 in FIG. 1 on the basis of commands from the user interface unit 206 (whole control program).

Figure 3:
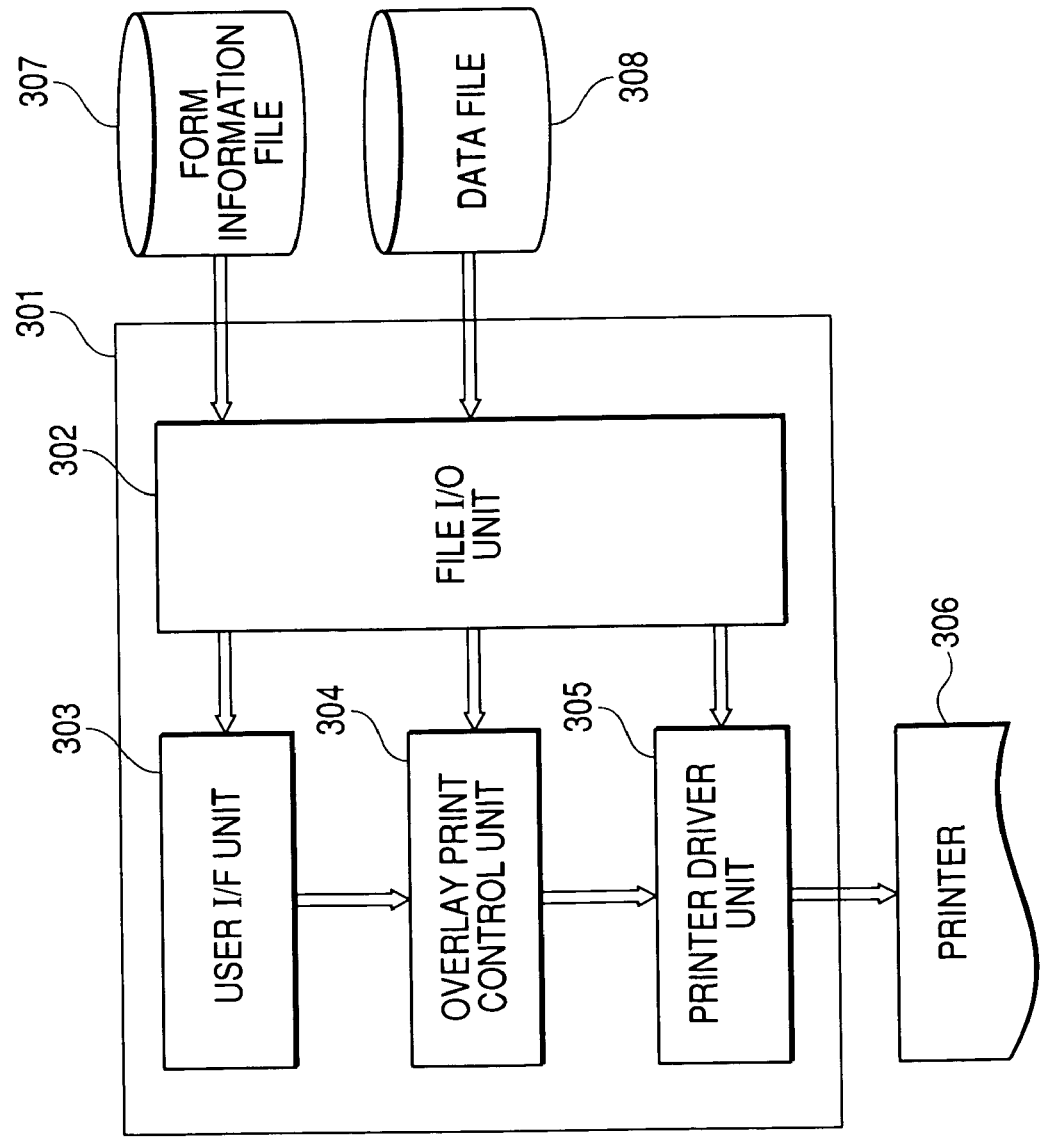
FIG. 3 is a block constructional diagram showing a construction of the overlay print control system in the embodiment of the invention.

FIG. 3 is a block diagram showing a construction of the overlay print system. In FIG. 3, reference numeral 301 denotes a whole overlay print system in the embodiment. When the overlay print system is used, the overlay print system 301 exists in the CS 106 in FIG. 1. The CPU 105 controls a file input/output unit 302 (file input/output control program), a user interface unit 303 (control program), and a printer driver unit 305 (printer control program), which will be explained hereinafter, on the basis of an overlay print control unit 304 (whole control program), which will be explained hereinafter, in the overlay print system 301.

The user interface unit 303 is a program for displaying a list of names of the form information files and a list of names of data files which were inputted from a form information file 307 and a data file 308 in the ASU 108 through the file input/output unit 302 onto the display 101 in FIG. 1, receiving selecting instruction information of the form information file name, data file name, and the like which were inputted by using the keyboard 102 in FIG. 1 or the pointing device (not shown) and designated by the user, and outputting it to the file input/output unit 302.

The file input/output unit 302 is a program for reading out the form information from the form information file 307 and reading out the designated data from the data file 308 on the basis of the selecting instruction information of form information file names, data file names, and the like which were inputted through the user interface unit 303 and outputting them to the overlay print control unit 304.

The overlay print control unit 304 is a program for outputting and registering the form information in the form information file 307 received through the file input/output unit 302 to a printer 306 through the printer driver unit 305, interpreting the data in the text format received through the file input/output unit 302, forming intermediate data (data modified so that bit map data can be easily formed by the printer driver unit 305), and outputting the intermediate data to the printer driver unit 305.

Figure 8:
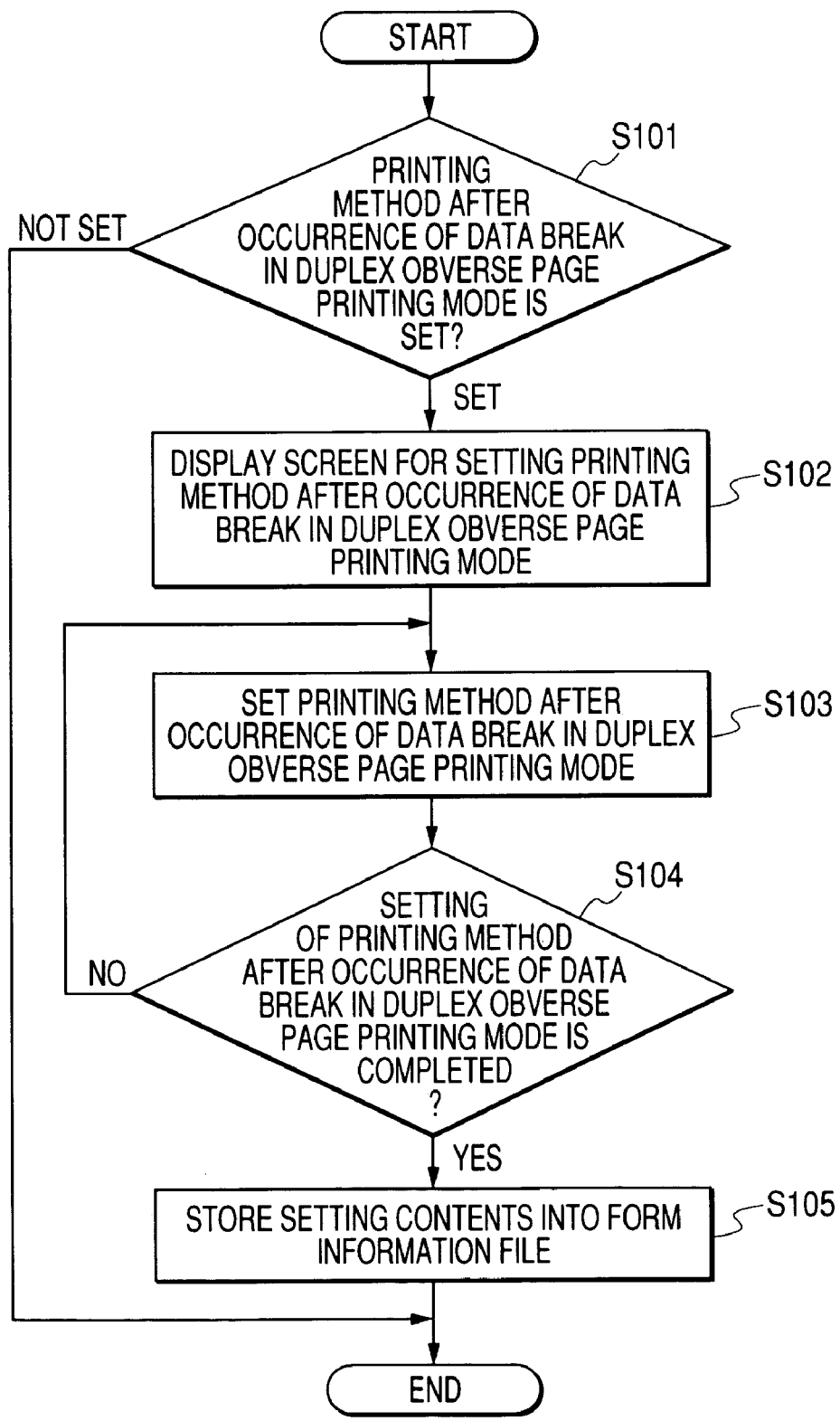
FIG. 8 is a flowchart showing the operation for setting the data printing method after the data break in the case where the data break occurs in the duplex obverse printing mode.

The specific operation of the embodiment will now be described with reference to FIGS. 8, 9A and 9B. FIG. 8 is a flowchart showing the operation for defining the data printing method after the data break in the case where the data break occurs in the duplex obverse printing mode when the form information file is designed in the form information designing system according to the embodiment of the invention. The control program shown in this flowchart corresponds to the user interface unit 206 in FIG. 2. When setting information for defining form information items is inputted through the display control unit 203, the CPU 105 executes the control program.

First, the CPU 105 discriminates whether or not the form information forming instruction inputted from the user through the display control unit 203 in FIG. 2 is an instruction to define the data printing method after the data break in the case where the data break occurs in the duplex obverse printing mode (S101). If it is determined in step S101 that the form information forming instruction from the user is not the instruction to define the data printing method after the data break in the case where the data break occurs in the duplex obverse printing mode, the processing routine is finished.

Figure 4:
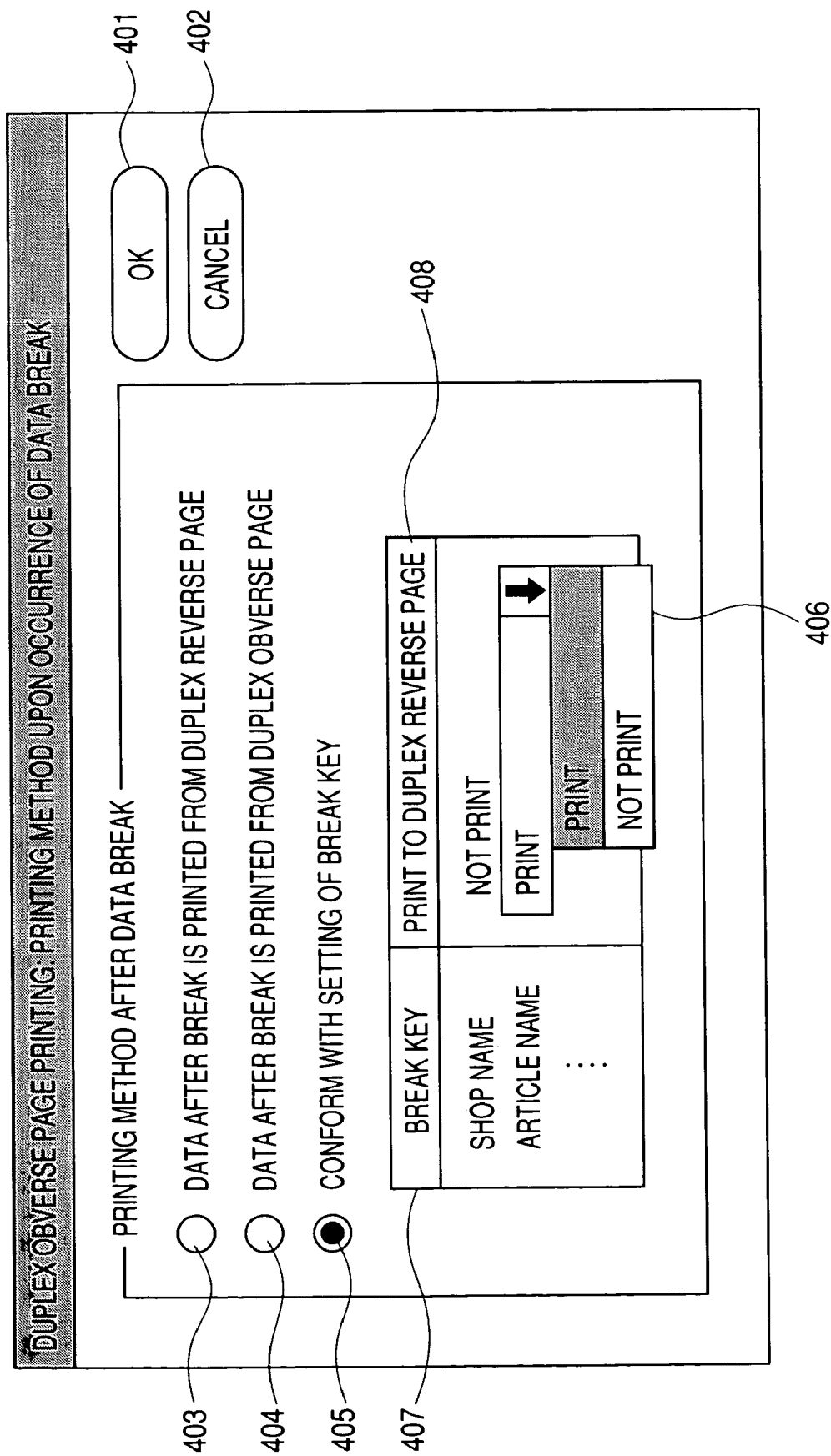
FIG. 4 is a diagram showing an example of a display format for setting a data printing method after a data break in the case where the data break occurs in a duplex obverse printing mode in the embodiment of the invention.

If it is determined in step S101 that the form information forming instruction from the user is the instruction to define the data printing method after the data break in the case where the data break occurs in the duplex obverse printing mode, a dialog for making such setting is displayed onto the display 101 in FIG. 1 in step S102. If NO in step S101, the processing routine is finished. After the dialog is displayed, the setting of each item in the dialog shown in FIG. 4 is made (S103). In the process of step S104, whether or not the setting of each item in the dialog has been determined and completed is discriminated. If it is determined that it has been completed in step S103, step S105 follows. If NO, the processing routine is returned to step S103 (S104). FIG. 4 shows an example of a display format for setting the data printing method after the data break in the case where the data break occurs in the duplex obverse printing mode. Reference numeral 403 denotes a radio button for instructing so that the data after the data break is printed from a duplex reverse page, and 404 indicates a radio button for instructing so that the data after the data break is printed from a duplex obverse page. The settings of those radio buttons 403 and 404 are validated with respect to all break keys in principle.

The break key can be set every field. When an article name radio button 405 is designated, an instruction is made so as to conform with the setting of the break key. Which one of the processes such as new-page, sheet exchange, and the like is designated can be instructed in accordance with the break key which is designated every shop name. Whether or not the duplex reverse printing is performed can be designated every break key corresponding to each item.

Referring to the break key designating field in FIG. 4, in a field of a shop name on the column of a break key 407, it is shown that although "not print" is set in a print field 408 to a duplex reverse page, if the break key occurs in the shop name, the printing to the duplex reverse page is not executed but a mode to exchange the sheet and print has been set. In the field of an article name on the column of the break key 407, it is shown that "print" is set in the print field 408 to the duplex reverse page. However, if the break key occurs in the article name, the printing to the duplex reverse page is not executed but a mode to exchange the sheet and print has been set.

Lastly, the setting of the data printing method (which was set in the processes in steps S102, S103, and S104) after the data break in the case where the data break occurs in the duplex obverse printing mode is stored into a form information file shown in FIG. 10, which will be explained hereinafter (S105). The processes according to the program are also finished once at this point of time.

Figure 10:
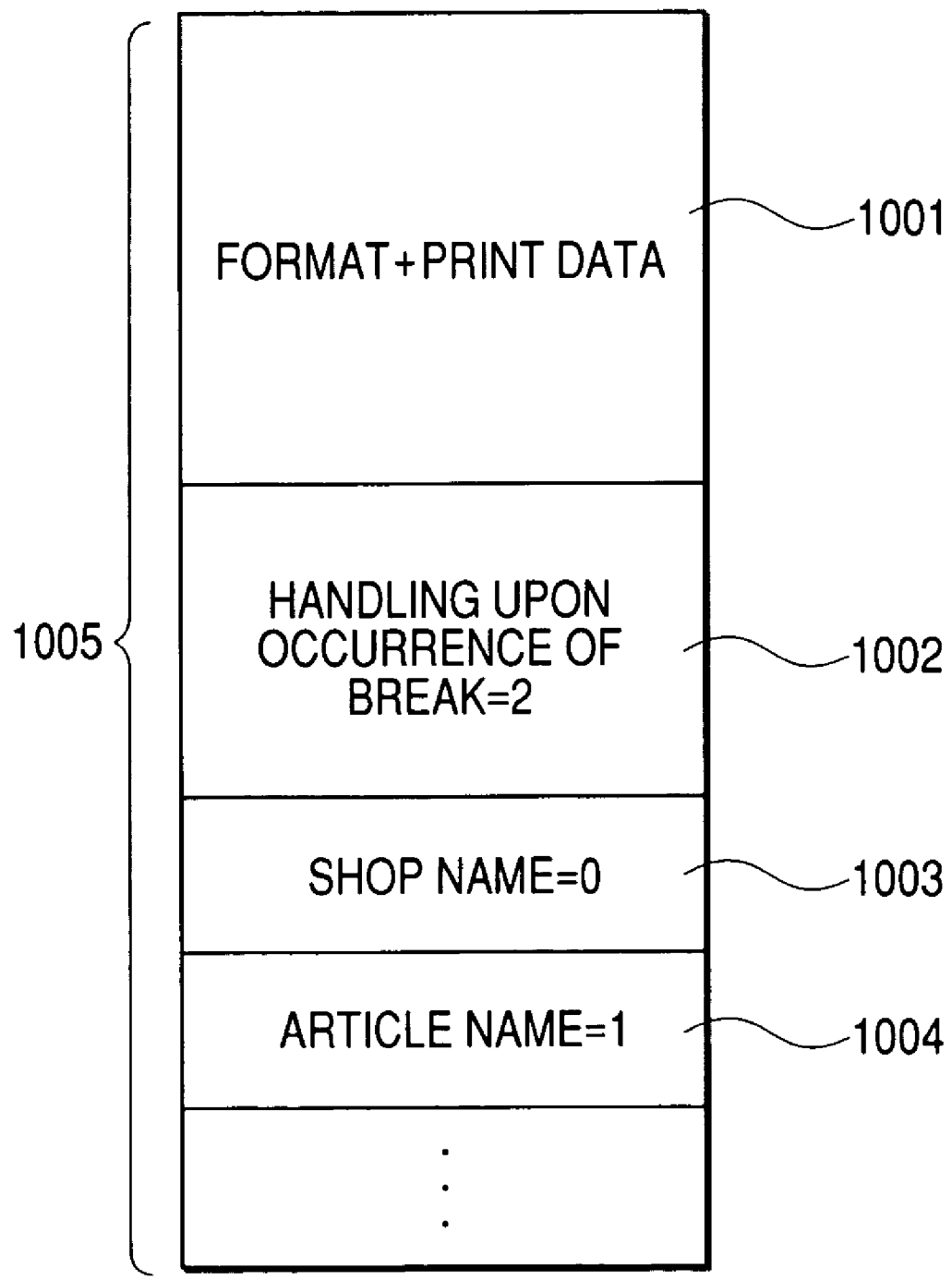
FIG. 10 is a diagram showing an example of the form information file.

FIG. 10 is a diagram showing an example of the form information file. Reference numeral 1001 denotes a format and print data and indicates a main body of the data which is used upon forming the image and 1002 indicates a flag showing handling at the time of occurrence of the break. One of "0", "1", and "2" is set in this flag. "1" is set as a default value. Naturally, "0" can be also set. When the radio button 403 in FIG. 4 is valid, Flag 1 is set. When the radio button 404 is valid, Flag 0 is set. When the radio button 405 is valid, Flag 2 is set. When Flag 2 is set into 1002, flags 1003, 1004, and subsequent flags are validated. The value "0" or "1" is set into the flags 1003, 1004, and subsequent flags. Reference numeral 1003 denotes the flag showing handling at the time of occurrence of the break every field.

Specifically speaking, since the radio button 405 has been instructed in FIG. 4 in the embodiment, "2" indicative of it has been stored in the flag 1002 in FIG. 10. Since the flag is set to "2", the flags 1003, 1004, and subsequent flags are validated. Flag 0 showing that the duplex obverse printing is set to "not print" in the column 408 in the shop name of the field 407 in FIG. 4 is stored into the flag 1003. Flag "1" showing that the duplex reverse printing is set to "print" with respect to the article name in the field 407. The values "0" and "1" are shown as an example and each flag can be also defined by another method using other symbols or the like.

Figure 9B:
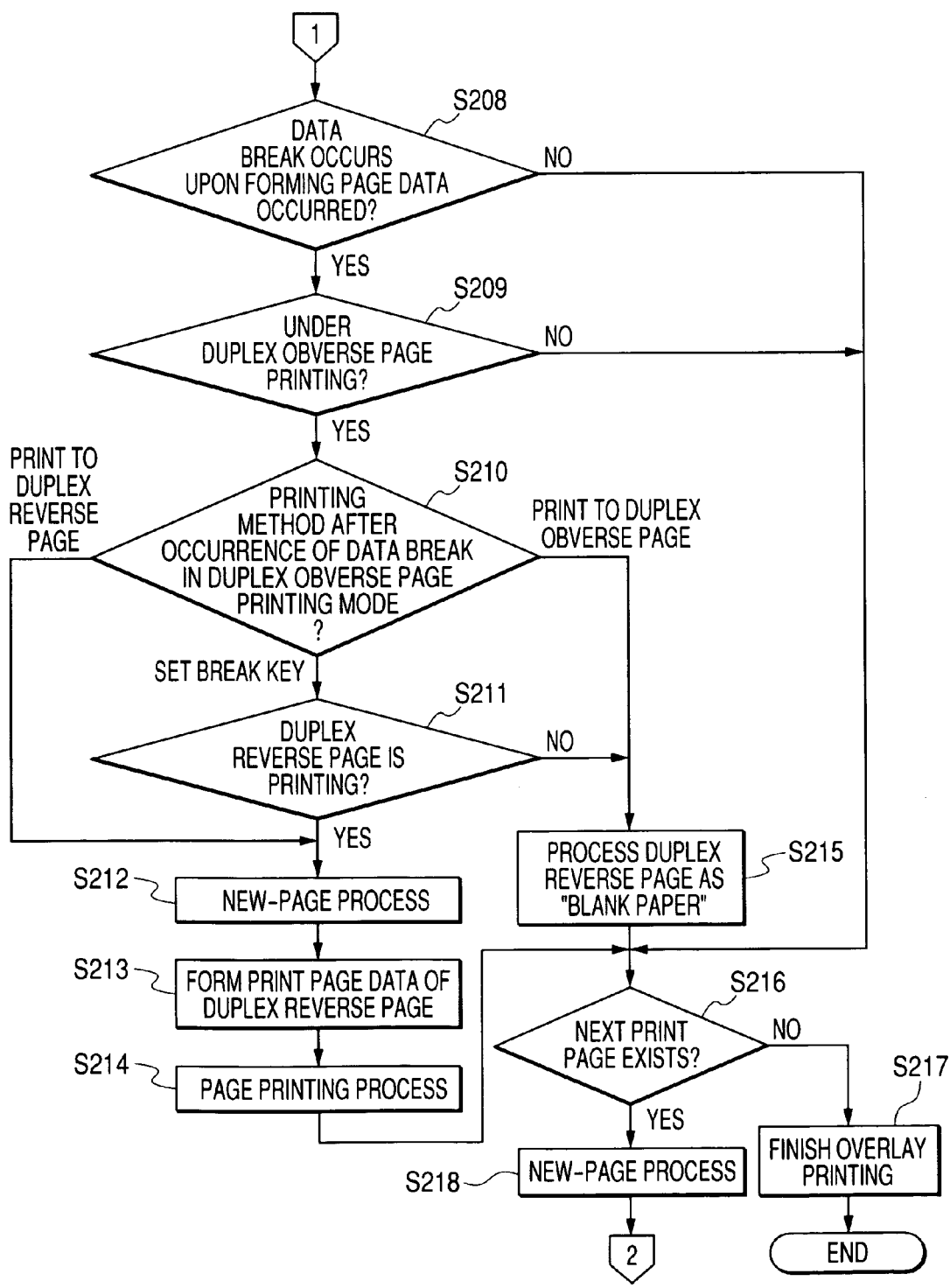
FIG. 9 is comprised of FIGS. 9A and 9B showing flowcharts of the operation for executing the overlay overlay printing process in the case where the data break occurs in the duplex obverse printing mode.

FIGS. 9A and 9B are flowcharts showing the operation for executing the overlay printing process in accordance with the setting of the data printing method after the data break in the case where the data break occurs in the duplex obverse printing mode in the overlay print system in the embodiment of the invention. The control program shown in this flowchart corresponds to the overlay print control unit 304 in FIG. 3. The CPU 105 executes the present control program at the time when the form file name, the data file name in the text format, and the instructing command of the overlay printing are inputted through the user interface unit 303 in FIG. 3.

First, the CPU 105 discriminates whether or not there is an overlay print instruction which was inputted from the user through the display control unit 203 in FIG. 2 (S201). If it is determined in step S201 that there is no overlay print instruction from the user, the processing routine is finished. If it is determined in step S201 that the overlay print instruction from the user exists, the user reads out the form information from the form information file 307 (S202) and reads out the data designated in the data file 308 (S203) on the basis of the selecting instruction information of the form information file name and the data file name which were inputted through the user interface unit 303. At this time, attributes necessary for the printing such as duplex setting and the like are also obtained (S204). FIG. 5 shows an example of display formats of the form information file 307 and the data file 308 which are designated by the overlay printing process.

Subsequently, after the execution of a process for starting the overlay printing (S205), print page data of the page to be printed first is formed (S206). The formed print page data is transferred to the printer 306 through the printer driver unit 305 and printed (S207). Whether or not the data break occurred in the page printed in step S207 when the print data is formed in step S206 is discriminated (S208).

If it is determined in step S208 that the data break occurred in the printed page when the print data is formed, whether or not the printed page is a duplex obverse page is discriminated (S209). If it is determined in step S208 that no data break occurred in the printed page when the print data is formed, step S216 follows. If it is determined in step S209 that the printed page is the duplex obverse page, the flags 1002 to 1004 stored in the form information file 307 in FIG. 3 stored in the storage shown in FIG. 1 and set in steps S102, S103, and S104 in FIG. 8 are read and the subsequent process is determined on the basis of the data printing method after the data break in the case where the data break occurs in the duplex obverse printing mode (S210 and subsequent steps). If it is determined in step S209 that the printed page is not the duplex obverse page, the processing routine advances to step S216.

If it is determined in step S210 that the mode to print the data after the data break onto the reverse surface of the same duplex sheet is designated, in other words, the flag 1003 in the form information file in FIG. 3 is equal to "1", the new-page process is executed (S212). After that, the print page data of the duplex reverse page is formed from the data after the data break (S213). The formed print page data is transferred to the printer 306 through the printer driver unit 305 and printed (S214).

The processes of S212, S213, and S214 are also executed in the case where it is determined in step S210 that the printing method of the data after the data break conforms with the setting of the break key, whether or not the flag 1003 is equal to "2" and the data is printed onto the reverse surface of the same duplex sheet for the break key is discriminated (S211), and it is determined that the mode to print onto the duplex reverse surface of the same sheet, that is, the flag 1003 or 1004 is equal to "1" is set.

If it is determined in step S210 that the printing to the duplex reverse surface is skipped and the data after the data break is printed onto the new duplex obverse surface, that is, the value of the flag 1003 is equal to "0", a process to forcedly output the duplex reverse page as "blank paper" is executed (S215). At this point of time, the process for printing as a duplex page is completed once.

After the printing process of the duplex page is finished, whether or not the next print page exists is discriminated (S216).

If it is determined in step S216 that the next print page exists, the new-page process is executed (S218). After that, the processes of steps S206, S207, S208, S209, S210, S211, S212, S213, S214, and S215 are executed. If it is determined in step S216 that the next print page does not exist, a process to finish the overlay printing is executed (S217). After that, the processing routine is finished.

S208 is the step of discriminating whether or not the data break occurred when the print data of the present print page is formed. S209 is the step of discriminating whether or not the printed page is the duplex obverse page. S210 is the step of discriminating the data printing method after the data break in the case where the data break occurs in the duplex obverse printing mode. S211 is the step of discriminating whether or not the data after the data break is printed onto the reverse surface of the same duplex sheet. S212 is the step of executing the new-page process. S213 is the step of forming the print data of the duplex reverse page. S214 is the step of outputting the print data of the duplex reverse page to the printer. S215 is the step of executing the process to forcedly output the duplex reverse page as "blank paper". S216 is the step of discriminating whether or not the next print page exists. S217 is the step of executing the process to finish the overlay printing. S218 is the step of executing the new-page process.

FIG. 6 shows an example of a result which was overlay-printed by the method of printing the data after the data break onto the reverse surface of the same duplex sheet in the case where the data break occurs in the duplex obverse printing mode.

When the data break occurs at the time of the printing of the obverse surface during the duplex printing, blank paper is inserted onto the reverse surface of the same medium having the duplex surfaces, the sheet is exchanged, and thereafter, the printing to the obverse surface is started. By this method, a layout of, for example, a statement of delivery using a document which uses a form can be certainly performed to another sheet in accordance with the selection of the user. For instance, it is possible to construct in such a manner that since the break key is automatically set at an "A" shop in accordance with an instruction in FIG. 4 by the user, a document of the "A" shop is printed and, thereafter, the printing can be performed to the reverse surface of the layout so that a document of a "B" shop does not come. Since the user having an intention of individually managing the document of the "A" shop and the "B" shop can freely select a desired layout, this method is extremely effective.

Figure 7:
FIG. 7 is a diagram showing an example of a result printed in the case where the data break occurs in the duplex obverse printing mode in the embodiment of the invention.

FIG. 7 shows an example of a result obtained by performing the overlay printing by the method whereby in the case where the data break occurs in the duplex obverse printing mode, the printing to the duplex reverse surface is skipped and the data after the data break is printed onto the obverse surface of a new duplex sheet. In this example, when the data break occurs in the article name field in the duplex obverse printing mode, the printing is continued from the reverse surface without exchanging the sheet. The user can select a desired printing method so as not to use unnecessary blank paper.

In a system in which the data break can be set every field of each item of a document, the user can select a desired duplex printing method by using the radio buttons in FIG. 3 in accordance with characteristics (shop name, article name) of the data break of each field.

In the foregoing embodiment, the setting of the data printing method after the data break in the case where the data break occurs in the duplex obverse printing mode is stored as an attribute in the form information file and realized by executing the printing process for the form information file. In the embodiment 2, such a process is executed as follows.

A function (printing method setting function after the data break) for setting the data printing method after the data break in the case where the data break occurs in the duplex obverse printing mode is provided in a library format from the overlay print system 301. The user can obtain a target print result by executing the printing method setting function after the data break before the overlay printing process.

A computer (shown by the whole FIG. 1) as a preferred example of an image processing apparatus is disclosed as described above. The CPU 105 executes the processing steps in FIGS. 8, 9A and 9B in the overlay print control unit 304 as an example of the control programs stored in the CS 106, thereby recognizing a data break command as an example of delimiters of the data for forming an image of the form print data onto a sheet, a CD-R, a DVD, an OHP, or the like as an example of a plurality of recording media each having the obverse surface and the reverse surface. In the case where the recognizing means recognizes the command which has been embedded in the data and shows the data break as an example of delimiters of the data when the image process is executed to form an image onto the obverse surface of a predetermined recording medium, there is recognized the flags 1002 to 1004 in FIG. 10 showing an instruction to select either the mode to continue the image forming operation to the reverse surface of the recording medium or the mode to exchange the recording medium and continue the image forming operation from the obverse surface of another recording medium. Further, control is made so as to exchange the recording medium in accordance with the recognized flag and form an image. Moreover, the control program controls the process for selecting either the mode to continue the image creation or the mode to exchange the sheet and form an image in accordance with the recognition result showing either the instruction (in the print data) to continue the image forming operation to the reverse surface of the recording medium such as a sheet or the instruction (in the print data) to exchange the sheet and continue the image forming operation from the obverse surface of another sheet. In addition, the control program controls the process for displaying the display screen (FIG. 4) on which it is possible to input at least either a message to continue the image forming operation to the reverse surface of the recording medium such as a sheet (such a message exists in the print data from the keyboard 102 or mouse as an example of the input units displayed on the display 101 as an example of display screens) or a message (in the print data) to exchange the recording medium and continue the image forming operation from the obverse surface of another recording medium. The foregoing control program can be also realized by using a function provided by a library having the overlay printing function as shown at 304 in FIG. 3.

According to the embodiment, since the setting of the data printing method after the data break in the case where the data break occurs in the duplex obverse printing mode is provided in the library format, the user, particularly, the system developer can easily construct software using such a function without programming by himself and independent of a file format that is peculiar to the software. In other words, a degree of freedom of the function is remarkably improved.

Other Embodiments

The processes shown in FIGS. 8, 9A and 9B in the embodiment are executed by a user PC, an image service provider, and a print site in accordance with a program which is installed from an outside, respectively. In such a case, the invention is also applied to a case where an information group including the programs is supplied to a host computer from a storing medium such as CD-ROM, flash memory, FD, or the like or from an external storing medium through a network.

Naturally, the object of the invention is also accomplished by a method whereby the storing medium in which program codes of the software for realizing the functions of the embodiments as mentioned above have been recorded is supplied to a system or an apparatus or the program codes are downloaded from an external server (not shown) and a computer (or a CPU or an MPU) of the system or the apparatus reads out and executes the program codes stored in the storing medium.

In this case, the program codes themselves read out from the storing medium realize the novel functions of the invention. The storing medium in which the program codes have been stored constructs the invention. As a storing medium for supplying the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only a case where the computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes. Further, naturally, the invention incorporates a case where the program codes read out from the storing medium are written into a memory provided for a function expanding board inserted in the computer or a function expanding unit connected to the computer, thereafter, a CPU or the like provided for the function expanding board or the function expanding unit executes a part or all of actual processes on the basis of instructions of the program codes, and the functions of the embodiments mentioned above are realized by those processes.

According to the embodiments as described above, by providing the user interface for designating the data printing method after the data break in the case where the data break occurs in the duplex surface printing mode and the means for executing the printing process in accordance with the set printing method, the form design which does not depend on the data and can certainly obtain the target print result can be performed, so that a load on the user is reduced. Moreover, since the number of kinds which can be realized as print results increases, there is such an effect that the degree of freedom in the application rises and the generality can be expected.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2003-372460 filed on Oct. 31, 2003, which is hereby incorporated by reference herein.

What is claimed is:

1. An image processing apparatus for forming images of data onto a plurality of recording media each having an obverse surface and a reverse surface, comprising:
    data break recognizing means for recognizing a data break at which continuous data breaks in a predetermined column of a table which sorts values column by column;
    discrimination means for discriminating whether an image forming operation is being executed on the obverse surface of a predetermined recording medium, if said data break recognizing means recognizes a data break;
    instruction recognizing means for recognizing an instruction for the predetermined column of the table, if said discrimination means discriminates that the image forming operation is being executed on the obverse surface of a predetermined recording medium, the instruction being for either a mode to continue the image forming operation to the reverse surface of the predetermined recording medium with the values following the data break or a mode to continue the image forming operation to the obverse surface of another recording medium with the values following the data break; and
    image processing control means for executing the image forming operation in accordance with the instruction recognized by said instruction recognizing means, wherein said image processing control means continues the image forming operation either to the reverse surface of the predetermined recording medium or to the obverse surface of the other recording medium depending on one of the two modes of the instruction.

2. An apparatus according to claim 1, further comprising display control means for displaying a display screen on which it is possible to input at least one of a message to continue the image forming operation to the reverse surface of the predetermined recording medium and a message to continue the image forming operation to the obverse surface of the other recording medium.

3. An apparatus according to claim 1, wherein said image processing control means, said data break recognizing means, and said instruction recognizing means use a function provided by a library having an overlay printing function.

4. An apparatus according to claim 1, wherein the data break occurs in a variable table.

5. An image processing apparatus according to claim 1, further comprising setting means for setting the instruction via a predetermined display screen.

6. An image processing method of forming images of data onto a plurality of recording media each having an obverse surface and a reverse surface, comprising:
  a data break recognizing step of recognizing a data break at which continuous data breaks in a predetermined column of a table which sorts values column by column;
  a discrimination step for discriminating whether an image forming operation is being executed on the obverse surface of a predetermined recording medium, if said data break recognizing step recognizes a data break;
  an instruction recognizing step recognizing an instruction for the predetermined column of the table, if said discrimination step discriminates that the image forming operation is being executed on the obverse surface of a predetermined recording medium, the instruction being for either a mode to continue the image forming operation to the reverse surface of the predetermined recording medium with the values following the data break or a mode to continue the image forming operation to the obverse surface of another recording medium with the values following the data break; and
  image processing control steps for executing the image forming operation in accordance with the instruction recognized by said instruction recognizing step, wherein said image processing control step continues the image forming operation either to the reverse surface of the predetermined recording medium or to the obverse surface of the other recording medium depending on one of the two modes of the instruction.

7. A method according to claim 6, further comprising a display control step of displaying a display screen on which it is possible to input at least one of a message to continue the image forming operation to the reverse surface of the predetermined recording medium and a message to continue the image forming operation to the obverse surface of the other recording medium.

8. A method according to claim 6, wherein said image processing control step, said data break recognizing step, and said instruction recognizing step use a function provided by a library having an overlay printing function.

9. A method according to claim 6, wherein the data break occurs in a variable table.

10. An image processing method according to claim 6, further comprising a setting step for setting the instruction via a predetermined display screen.

11. A computer readable medium comprising a control program for controlling an image processing method of forming images of data onto a plurality of recording media each having an obverse surface and a reverse surface, comprising:
  a data break recognizing step of recognizing a data break at which continuous data breaks in a predetermined column of a table which sorts values column by column;
  a discrimination step for discriminating whether an image forming operation is being executed on the obverse surface of a predetermined recording medium, if said data break recognizing means recognizes a data break;
  an instruction recognizing step for recognizing an instruction for the predetermined column of the table, if said discrimination steps discriminates that the image forming operation is being executed on the obverse surface of a predetermined recording medium, the instruction being for either a mode to continue the image forming operation to the reverse surface of the predetermined recording medium with the values following the data break or a mode to continue the image forming operation from the obverse surface of another recording medium while the values following the data break; and
  image processing control steps for executing the image forming operation in accordance with the instruction recognized by said instruction recognizing step, wherein said image processing control step continues the image forming operation either to the reverse surface of the predetermined recording medium or to the obverse surface of the other recording medium depending on one of the two modes of the instruction.

12. A computer readable medium comprising a control program for controlling an image processing method according to claim 11, further comprising a setting step for setting the instruction via a predetermined display screen.

13. An image processing apparatus for forming images of data onto a plurality of recording media each having an obverse surface and a reverse surface, comprising:
  a data break recognizing device for recognizing a data break at which continuous data breaks in a predetermined column of table which sorts values column by column;
  a discrimination device for discriminating whether an image forming operation is being executed on the obverse surface of a predetermined recording medium, if said data break recognizing device recognizes a data break;
  an instruction recognizing device recognizing an instruction for the predetermined column of the table, if said discrimination devices discriminates that the image forming operation is being executed on the obverse surface of a predetermined recording medium, the instruction being for either a mode to continue the image forming operation to the reverse surface of the predetermined recording medium with the values following the data break or a mode to continue the image forming operation to the obverse surface of another recording medium with the values following the data break; and
  image processing control steps for executing the image forming operation in accordance with the instruction recognized by said instruction recognizing means, wherein said image processing control step continues the image forming operation either to the reverse surface of the predetermined recording medium or to the obverse surface of the other recording medium depending on one of the two modes for the instruction.

14. An image processing apparatus according to claim 13, further comprising setting means for setting the instruction via a predetermined display screen.

* * * * *